United States Patent [19]

McIntyre et al.

[11] 4,317,704

[45] Mar. 2, 1982

[54] METHOD OF OPERATING AN ELECTROLYTIC CELL

[75] Inventors: James A. McIntyre; Robert F. Phillips, both of Midland, Mich.

[73] Assignee: The Dow Chemical Company, Midland, Mich.

[21] Appl. No.: 165,445

[22] Filed: Jul. 2, 1980

Related U.S. Application Data

[63] Continuation-in-part of Ser. No. 882,834, Mar. 2, 1978, Pat. No. 4,224,129.

[51] Int. Cl.³ ............................................... C25B 1/34
[52] U.S. Cl. ..................................... 204/1 R; 204/98; 204/128
[58] Field of Search ................. 204/98, 128, 1 R, 265, 204/258

[56] References Cited

U.S. PATENT DOCUMENTS

4,186,066  1/1980  Langley ................................. 204/98
4,187,350  2/1980  McIntyre et al. ...................... 204/98
4,191,618  3/1980  Coker et al. .......................... 204/98

Primary Examiner—R. L. Andrews
Attorney, Agent, or Firm—James H. Dickerson, Jr.

[57] ABSTRACT

A method of operating an electrolytic cell comprising: forming a gas-liquid mixture of an oxygen-containing gas and a catholyte; and flowing the mixture through interconnecting passageways of a porous cathode, while the cathode is maintained at a voltage sufficient to reduce at least a portion of the oxygen as the mixture flows through the cathode.

17 Claims, 11 Drawing Figures

METHOD OF OPERATING AN ELECTROLYTIC CELL

CROSS-REFERENCE TO RELATED APPLICATION

This is a continuation-in-part application of copending application Ser. No. 882,834, filed Mar. 2, 1978, now U.S. Pat. No. 4,224,124.

BACKGROUND OF THE INVENTION

Gas electrodes, in which a gas is bubbled over a suitable conductor immersed in an electrolyte solution are well known. Such assemblies even find occasional application for use as reference electrodes.

In the configuration described, the actual relative utility for either galvanic (as, for example, in battery arrangements) or electrolysis (as, for example, in chlor-alkali processes with salt brine) operations is usually quite limited due to the ordinarily low current densities ordinarily therewith obtained.

Many types and varieties of porous and generally catalytically-active electrodes have been developed and are available which are intended and designed to current density realizations. This is effected by means and virtue of physical structuring that is characterized in presenting high actual electrode surface area within and throughout the confines of a reasonably- and practically-sized body insofar as spatial requirements for externally exposed area and apparent body volume are concerned. Electrodes so styled are designed with the premise, calculated to provide practical current density obtention in and through the electrode, of achieving bilateral mutually partial penetration into the interstices of the porous, electroconductive, catalytic body structure of electrolyte solution from and into one side of the body and reactive gas (such as one consisting or comprised of hydrogen or oxygen and so forth) from and into the other side of the body so that the oppositely ingressing, heterogenously-phased gas and liquid components form an interface within substantially entirely if not all of said interstitial passageways.

Electrochemical reaction then occurs within the porous electrode. In the case of fuel cells and other types of battery assemblies wherein appropriate anode, cathode and electrolyte selections are involved, useful electrical power generation is had. In cells for electrolysis wherein choice of appropriate electrolyte(s) is made along with suitable picking of anode and cathode for the system, useful products of the transformed anolyte and/or catholyte are obtained.

Various aspects relevant to the use of gas electrodes in galvanic and electrolysis mode applications, including oxygen depolarized cathodes in electrolytic cells, are amply demonstrated in, inter alia, U.S. Pat. Nos. 1,474,594; 2,273,795; 2,680,884; 3,035,998; 3,117,034; 3,117,066; 3,262,868; 3,276,911; 3,316,167; 3,377,268; 3,507,701; 3,544,378; 3,645,796; 3,660,255; 3,711,388; 3,711,396; 3,767,542; 3,864,236; 3,923,628; 3,926,769; 3,935,027; 3,959,112; 3,963,592; 4,035,254; and 4,035,255; and Canadian Patent No. 700,933; all and all therein being herein incorporated by reference. A demonstration of a porous, flow-through electrode appears in the literature in an Article by H. Khalifa et al. entitled "Electrochemical Reduction of Oxygen At A Porous Flow-Through Electrode" in *J. Electroanal. Chem.*, 81 (1977) 301–307.

Such electrodes which utilize oxygen and are known as oxygen gas-bearing depolarized electrodes are of especial interest in chlor-alkali operation and analogous electrolyzations of other alkali metal or acid halides. U.S. Pat. No. 1,474,594, by way of particular note, is an early reference mentioning the passage of a mixture of air or oxygen over the surface of a conventional electrode. In the electrolysis of common salt brine, for example, the reaction at the depolarized cathodic oxygen electrode in the alkaline media of the catholyte is:

$$O_2 + 2H_2O + 4e^- \rightarrow 4OH^- \text{ with } E° = 0.401 \text{ v.}$$

In comparison, the cathode reaction in a traditionally conventional chlor-alkali cell is $$2H_2O + 2e^- \rightarrow H_2 + 2OH^- \text{ with } E° = -0.828 \text{ v.}$$

Thus, the use of an oxygen gas bearing depolarized electrode for chlor-alkali electrolytic cells brings about a theoretically achievable electrical potential requirement saving of 1.229 volts. This, for practical purposes, translates to the possibility of very substantial reduction in and economization of power costs when reckoned from the basis of the usual relatively low voltages (frequently in the range of ca. 2 to 5 volts) at which a typical chlor-alkali diaphragm cell operates in order to effect the desired electrolysis and accommodate associated overvoltage requirements.

Nonetheless, there are certain difficulties involved in the heretofore known and applied use of porous electrodes. Besides ordinarily high cost, two of the more predominant and serious problems associated therewith are catalyst longevity and flooding. The latter phenomenon involves the deleterious liquid filling of all, or at least most, of the pores in the electrode structure with simultaneous corresponding exclusion of gas therein. This then effectively incapacitates the electrode and brings about loss of desired reaction occurrence therein and therewith. Several means and expedients have been utilized to avoid or overcome at least the flooding problem including wetproofing of at least a portion of the pores, porosity control and so forth. These, however, are oftentimes expensive and/or tedious and difficult to effectuate rendering them impractical despite their apparent value.

The basic characteristics and operational principles and limitations of porous electrode design and utilization practice are so widely comprehended by those skilled in the art that further elucidation thereof and elaboration thereon in unnecessary for thorough understanding and recognition of the advance contributed and made possible to achieve by and with the development(s) of the present invention.

FIELD AND OBJECTIVES OF THE INVENTION

The present invention pertains to and resides in the general field of electrochemistry and is more particularly applicable to an improved oxygen gas-bearing electrode with a porous body structure and flow-through style of operational function all along the lines generally indicated in the foregoing and more fully and particularly delineated in the following. The contemplated electrode which has an appropriate accommodating porous structure for the purpose is adapted to handle, catalyze and react, with an open flooding passage therethrough, pre-mixed and intimately blended fluid feed of oxygen or oxygen-bearing gas and desired electrolyte solution in such a way as to preclude and avoid at least the major problems and drawbacks predominantly coincident with conventional gas electrodes including porous versions thereof. Utilization of the electrodes of the instant invention, and the discovery upon which it is based, is calculated to circumvent and avoid the considerable disadvantage of trying to balance the pressure between gas and liquid phases in a porous electrode. Additionally, in most cases, long electrode life is possibilitated as well as the ordinarily-expectable ability to operate electrolysis cells at reasonable and about normally low voltage conditions with marked reduction of involved energy needs. The provision and use of such an advantageous and beneficial oxygen electrode arrangement are amongst the principal aims and objectives of the invention.

SUMMARY OF THE INVENTION

An improved and novel oxygen gas-bearing cathode electrode for electrolytic cells has been developed. As is herein evident, the electrode more precisely comprises an electroconductive porous body having therein and therethrough a plurality of micro-size, pore-like fluid mass transferring and transmitting interstitial passageways; mounting holder means for supporting and maintaining said electrode body immersed in an electrolyte when same is contained in the cell for which the electrode is provided, said holder means adapted to position said electrode body with a portion of its exposed, pore-bearing exterior facing opening into the cell and at least another exterior portion of said body openly accessible for receipt of fluid to be fed to and through said electrode body for utilization in the cell; the surfaces within the electrode body of said interstitial passageways being catalytically active at least as to and for the electrochemical reduction of oxygen in appropriate aqueous media; and means in cooperative associated combination with said electrode body for first intimately mixing and interdispersing in entrainment an oxygen-gearing gas with an electrolyte solution for utilization by the cell when said electrode body is contained in the cell, then forwarding said mixed gas-entrained electrolyte mixture under pressure for force feeding same to said electrode body for mass transfer in fluid-flooding passage through the interstitial passageways in and traversing said electrode body.

The electrode body advantageously has a foraminous metallic construction and may either be comprised of a plurality of suitably fine-mesh electroconductive screens stacked in a packed bundle with each one therein reposed upon and against one another in the bundle or a closely packed assemblage of individually loose small particles, especially when they are in the form of small, flat, metallic chips, or, and as another alternative, the electrode body may be of a sintered metal particle construction.

The invention also has within its purview the provision of an operable electrolytic cell constructed with the novel electrode as a component thereof, particularly when utilized as an oxygen depolarized cathode. It also contemplates within its scope the method of operating an electrolytic cell equipped with such an electrode running in either the electrolysis or galvanic mode including the application of such method of chlor-alkali manufacturing installations and procedures.

ILLUSTRATED REPRESENTATION OF THE INVENTION

Further features and characteristics of the oxygen gas-bearing, porous, flow-through electrode assembly development in accordance with the present invention, and the way in which it so nicely achieves and fulfills the presently-intended aims and objectives and contributes to the art for which it is pertinent are more readily apparent and evident in the ensuing Specification and description, taken in conjunction with the accompanying Drawing, wherein (using like reference numerals for like parts).

PARTICULARIZED EXEMPLIFICATION OF THE INVENTION

Figure 1:
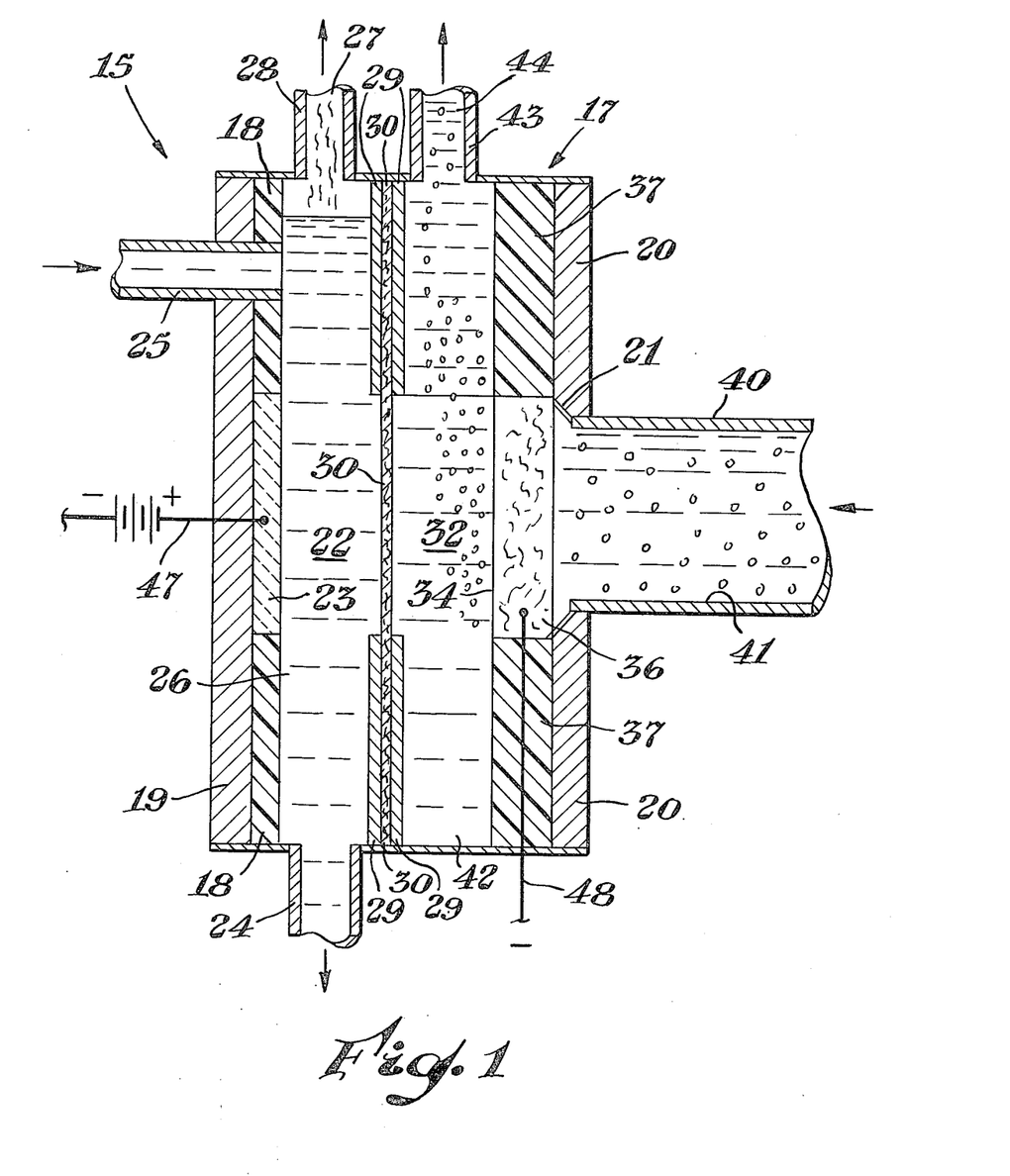
FIG. 1 is a schematic, largely simplified and fanciful, exaggerated elevational view, in section, of an electrode arrangement in accordance with the present invention.

With initial reference to FIG. 1 of the Drawing, there is shown an electrolytic cell assembly, identified generally by the reference numeral 15, that is designed to accommodate and operate with a porous, flow-through, oxygen electrode arrangement in accordance with the present invention which is generally identified by reference numeral 17. For purposes of immediate illustration, the cell 15 is pictured to be electrolyzing sodium chloride brine into chlorine and sodium hydroxide with electrode 17 operating as a depolarized cathode in and for the system.

The cell 15 is maintained in assembly between backing plates 19 and 20 with any suitable means (not shown) for keeping the unit securely together, such as through and by means of an interconnected enclosing housing member (not shown) to complete the support structure. In the cell there is an anode compartment 22 with an anode 23 held in place by, for example, a suitable non-conducting anode holding plate mount 18, which is of an inert plastic material such as polymethylmethacrylate or the like or equivalent, at which the oxidation reaction takes place, positioned therein. This is in spaced juxtaposition with a cathode compartment 32 having therein situated an electrode arrangement 17 containing the porous electrode body 34 which, as a result of the oxygen contained in the feed stream passed therethrough as more fully explained in the following, functions as a depolarized cathode at which the reduction reaction takes place. A separator 30, held in place by engaging mounting members or holders 29, is centrally positioned in the cell to divide or separate anode compartment 22 from cathode compartment 32. The separator 30 is adapted to pass sodium ions from the anolyte solution 26 to the catholyte solution 42 in cathode compartment 32. Separator 30 may be a conventional asbestos or the like type diaphragm or, frequently with considerable advantage, an ion exchange screeen or membrane of the sort hereinafter more fully explained.

Typically, cell 15 further includes a supply of sodium chloride brine which is admitted to provide anolyte 26 through the anolyte inlet conduit 24 and withdrawn for circulation and reconstitution by any suitable cycling means for the purpose (not demonstrated) through anolyte outlet conduit 25. The anolyte cycling means is adapted to maintain the anoylte 26 at a predetermined, desired and suitably operable relatively constant sodium chloride concentration which is generally found at gradient values in the anolyte chamber between inlet and outlet conduits 24 and 25.

Gaseous chlorine 27 is removed from anode compartment 22 by any suitable means, such as conduit 28, which is connected in an appropriate venting communication with the compartment in order to safely and efficiently afford the desired withdrawal and recovery of the halogen product.

As mentioned, the separator 30 may be an asbestos or the like diaphragm structure. Alternatively, as also mentioned, a cation exchange screen or membrane can often be more beneficially employed. These are of the well-known sort which contain fixed anionic groups that permit intrusion and exchange of cations while excluding anions from an external source. Generally, the resinous membrane or equivalent separator structure has a cross-linked polymer or the like matrix or support construction to or with which are attached or included such negatively charged radicals as: $-SO_3^-$; $-COO^-$; $-PO_3^=$; $-HPO_2^-$; $-AsO_3^=$; and $-SeO_3^-$. Vinyl addition polymers and condensation polymers may be utilized for composition of the cation exchange construction, including polymers of such monomers a styrene, divinylbenzene, ethylene and the like aliphatic olefins and monomeric fluorocarbons. Preparation of such resinous materials is described in U.S. Pat. No. 3,282,875. The ion exchange membranes available under the trade-designation "Nafion" from E. I. duPont de Nemours and Company, Inc. are well suited for the indicated purpose.

The porous, flow-through, oxygen electrode arrangement 17 is fixed next to the backing plate 20 with the porous body 34 thereof held in place by, for example, a suitable non-conducting holding plate mount 37 which, advantageously, is of an inert plastic material such as polymethylmethacrylate or the like or equivalent. An opening 21 in backing plate 20 accommodates inlet conduit 40 for conveying and charging under suitable pressure into the system in the direction indicated by the arrow from a source (not shown in FIG. 1) the intermixed, heterogeneously phased entrapped and entrained gas-containing catholyte feed mixture 41 which consists of an aqueous solution of sodium hydroxide, suitably proportioned, mixed with oxygen. If desired, other oxygen-bearing gases may be used to make up feed stream 41 including air, oxygen-enriched air, ozone or the like or equivalent. The pressurized feed stream is then forced through a suitable porous, catalytically-active material 36 (hereinafter more fully specified) of which the porous body 34 of electrode assembly 17 is comprised. During this passage, the described electrochemical reaction in alkaline media of oxygen and water occurs. The reacted feed stream plus excess gas (as is usually employed) then passes into and through catholyte chamber 34 as catholyte 42.

During cell operation, the catholyte 42 becomes increasingly enriched in its concentration of sodium hydroxide. This co-product is removed in regulated fashion to keep catholytic caustic content at a controlled strength by taking reacted catholyte product 44, which has a higher sodium hydroxide content than feed stream 41, along with excess, unreacted gas out of the catholyte chamber through withdrawal conduit 43. After its removal, the caustic enriched catholyte is treated in any desired way to recover the sodium hydroxide therefrom by means not shown in FIG. 1. Usually, only part of the caustic is taken out of the enriched catholyte product 44 with the balance recycled for reconstitution with necessarily added water and oxygen to provide additional catholyte feed mixture 41 for continued use in the system.

The electrical energy necessary to conduct the electrolysis in cell 15 is obtained from a power source 46 connected to energy transmission or carrying means such as aluminum or copper conduits, bus bars or cables 47 and 48 to respectively provide direct electrical current to the anode 23 and the cathode 17.

As will be readily apparent to those skilled in the art, a cell of the type illustrated in FIG. 1 is readily adaptable to operating in the galvanic mode in a way quite analogous to that above described for an electrolysis mode function; an appropriate anode material and a suitably cooperative electrolyte being utilized for the purpose with, in general, no separator element 30 being utilized and the power source 46 being obviously eliminated and replaced by a means for collecting and/or utilizing the thereupon generated electrical power.

The actual and essential catalytically-active material for and construction of the flow-through section 36 of which the porous body unit 34 in the oxygen gas bearing electrode 17 is constituted may be appropriately chosen from a relatively wide range and numerous variety of available and suitable selections, the choice depending in each instance on what is intended to be done with the cell and the anticipated conditions of operation thereof, as well as the nature and chemical propensities of the electrolyte being fed through the cell in the presence of the intimately distributed and contained gaseous oxygen in the electrolyte with, of course, some actual gas dissolution in the electrolyte invariably occurring to some minor extent. Of course, material 36 should be relatively if not completely inert and resistant to chemical attack by the gas/electrolyte mixture. This, at least as a minimum in this regard, should be during actual cell operation (it being possible, for example, for some materials due to cathodic protection influences and other factors of chemical consequence when the cell is running with electrical flow therethrough to be adequately resistant to corrosion by the gas/electrolyte mixture despite being quite susceptible to attack in the non-electrified presence of same or the electrolyte alone, as is the case of iron, mild steel and other ferrous alloys in catholytes for chlor-alkali systems).

Thus, the material 36 may be in the form of porous sintered powder or otherwise finely particulated metal or other suitable compositional and the like structures; appropriately arranged and compiled nestings or interstice-providing assemblies or stacked bundle arrays of foraminous metal or other sheets or apertured layers or grid-like bodies including, in particular, woven and/or nonwoven mesh or screening; cartridge-like assemblies of suitable fiber-like or filamentary material having fine opening, through passageway structure therethrough; non-interbonded packs or assemblage piles of individually loose chips, flakes or other particulate bodies of appropriate materials; permeable membrane formations; combinations thereof and so forth.

Absolute dimensional limits and ranges relevant to electrode body constitution and size and porosity geometrics and values therefor are difficult to prescribe for any and all situations due to the particular exigencies existent under given operating conditions utilizing specific cell and electrode body materials and electrolyte reagent compositions in the system. In some cases, as is generally discernible by straightforward and readily performable testing along sometimes even trial-and-error or Edisonian lines by one skilled in the art, the most suitable embodiments for any desired operation may be found to lie without the approximated material and dimensional parameters below indicated which, of course, constitute no real problem insofar as concerns authentic following and practice of the present invention.

The average or mean pore or interstitial passageway diameter or, in irregularly and/or non-circularly cross-sectioned passageways, next best equivalent dimension is ordinarily found to be in micro-sizes between about 0.1 and about 20 microns with a range between about 0.5 and about 12 microns being sometimes more suitable and, quite frequently, such measure on the order of from about 3 to about 8 microns being quite suitable for most practical adaptation. In most cases, the open area of the pores in the plane of their emergence on the exposed faces of the electrode body is advantageously between about 20 and about 40 percent of the total exposed face area of the electrode body.

True pore or fine open passageway length is very difficult and oftentimes (even on a median or average basis) literally impossible to set or define. This is due to the ordinarily individually and complexly varying sinuous or serpentine, winding and frequently coiled or corkscrew-like in either relatively regular and/or diversely volute fashion, possibly even thick and thin cross-sectional, commonly indirect and/or indefinite and frequently forked or branch-tunneled sort of pattern routes or path followings that the multiplicity of pores usually jointly and severally assume in their almost invariably meandering style of traverse of the porous electrode body structure. Notwithstanding, the involved width or depth (depending on how considered) of the constructed electrode body 34 traversed from functional side-to-side or top-to-bottom, as the case may be, by the substantial totality of the contained interstitial passageways is a pragmatically satisfactory index or signification of probable mean or at least suitably effective pore length in any given electrode body, taking into account the particular material of and manner for construction thereof. The body thickness may thus vary in the overall between from about 5 to about 500 or more mils (ca. 0.125 millimeters and 1.3 or so centimeters). More often, it is the range between about 10 mils and about 250 mils (ca. 0.25 millimeters and 0.6 centimeters). In many cases, an appropriate body thickness is found to be between about 15 and about 100 mils (ca. 0.375 and 0.25 millimeters).

A usually apropos rule or governing relationship between diametric equivalent pore size or cross-sectional character and electrode body thickness to most efficaciously achieve the desired pore-flooding, fluid mass transfer is for the body thickness to be relatively greater with increasing largeness of the pore size, giving proper account to the factor that pores of a too diminutive nature tend to interfere with attainment of proper and efficacious continued mixing of the through-passing gas/electrolyte fluid and overly large pores sacrifice a larger and more optimum ratio of available pore surface area to enclosed pore passage volume. This involves per the foregoing indication, as will appear to those skilled in the art, a matter of operability ratio of available actual interstitial surface area with volume per unit time for surface contact of the mixed gas/electrolyte fluid passing therethrough. Obviously, flow resistance of the flow-through passageways to flooding penetration by the pressurized fluid also has considerable bearing on this; it being clear that greater fluid pressures forcing the mass transfer of the gas/electrolyte mixture through the porous electrode body generally tend to allow utilization of finer pored and thinner body constructions so long as the rupture point or burst strength of the electrode body is not exceeded by the propelling pressure head applied to the fluid being fed to the system. As is evident, the pressure employed to push the gas/electrolyte mixture through the electrode body must be sufficiently high to overcome both the capillary fluid flow resistance in the pores of the electrode body plus the hydrostatic head pressure of the electrolyte in contact with the electrode (which can be considerable in larger installations). The exposed face area and the apparent volume of the electrode body are matters within the choice and design made with given cell components and reactants to accommodate desired system capacities and target rates or quantities of and for raw material consumption and product output (including energy when galvanic systems are involved).

Depending on the nature of the particular electrolyte(s) and anode involved in a system, the base material for the electrode body may be either metallic or non-metallic in nature. Carbon (including graphite forms thereof which in the usual cases are usually advantageously catalytically coated or plated) is often a suitable non-metallic base, while such metals as tantalum or titanium, copper, various ferrous alloys and metals and/or oxides of the platinum group including gold, iridium, nickel, osmium, rhodium, ruthenium, palladium, platinum, and silver (or compositions, alloys and platings thereof) including, as an illustration, a suitable foraminous copper substrate that is silver plated. In any event, the electrode body material has, inherently or by treatment or modification (such as with platings, coatings and so forth), to be resistant to chemical attack—at least during cell operation—by the contacting gas/electrolyte material that is utilized.

As mentioned, the electrode must be catalytically active to most effectively produce the desired oxygen reduction during passage therethrough of the generally aqueous, oxygen-bearing gas/electrolyte mixture. Of course, the catalyst activity need only be on the interstitial surfaces interior of the electrode body to provide the necessary effect. This allows for the beneficiating utilization of catalytic coatings, platings or other depositions on and of the pore surfaces to render to desired reaction-promoting capability a material for an electrode body construction that is not intrinsically catalytic. While there are a number of workable catalyst substances for the various electrochemical reactions possible to achieve by practice of the present invention, the mentioned platinum group metals and many of their compositions, especially the oxides, generally have quite good potential for this function. Silver and gold are good examples of this, as well as nickel. The latter, for reasons of availability, relative economy, desirable physical characteristics and ready workability, is frequently desirable for use in one way or another and with or without plating as the material employed for electrode body construction. When a plated catalyst layer is utilized, such as one of silver on copper or graphite, it should be substantially if not completely continuous and in a deposited thickness of up to about 2 mils (ca. 500+ microns).

Reverting now to FIGS. 2 through 5 of the Drawing, there are therein shown two diverse forms of oxygen gas-bearing electrodes advantageously embodied in accordance with the present invention. The dimensions and measurements associated with these are set forth only for illustrative purposes to aid in visualization of the depicted embodiments; being in no way restrictive or limiting of size variation possibilities therefor.

Figure 2:
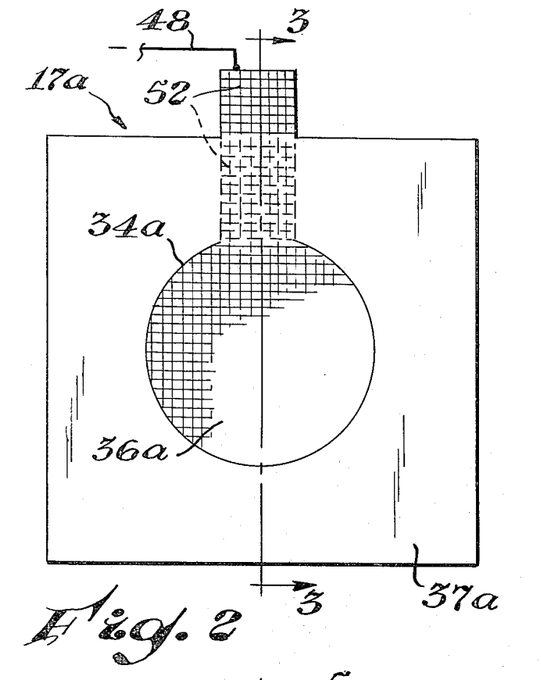
FIGS. 2 and 3 are, respectively, a front elevation view and a side elevational cross-sectional view taken for FIG. 3 along Line 3—3 in FIG. 2 of one embodiment of the oxygen gas-bearing, porous electrode development.
Figure 3:
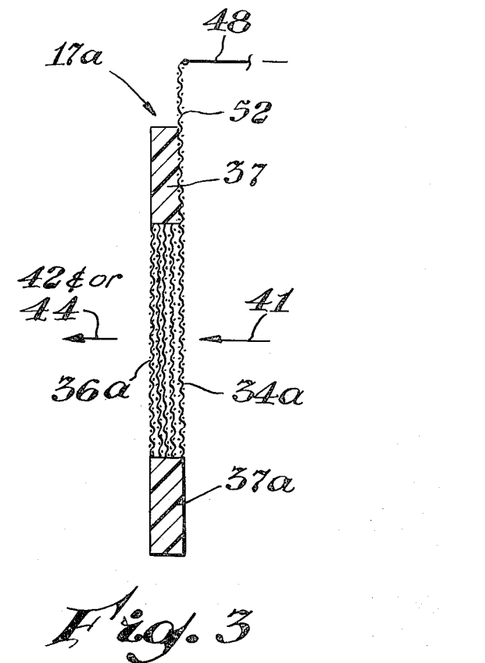

The relatively small-scale, screen-type electrode depicted in FIGS. 2 and 3 and generally identified by reference numeral 17a is housed in a square, polymethylmethacrylate mounting 37a having a thickness of about ¼ inch (ca. 0.635 centimeter) with a central circular cavity opening therethrough having a diameter of about 2 inches (ca. 5.08 centimeters) to receive the porous electrode body 34a which is constructed as material 36b in a plurality of stacked, silver-plated, nickel wire screens cut into disc-like forms to closely conform to the hole in the cavity wherein they are secured by any suitable means (not shown). The circular area of the stacked screen array is about 3 square inches (ca. 19.35 square centimeters). It is usually preferable to have no particular alignment in the screen bundle of the openings in the several screen layers therein. Typically, the screen in such an assembly can be made from wire to provide a woven to 200 mesh specification (or not finer than about 300 mesh) in the U.S. Standard Mesh Size Series. Twelve nested screen discs can be utilized to comprise the body 34a which can be held in place in mounting 37a by peripheral attachment with an epoxy cement. The silver plating on the screen can be of sufficient thickness to provide a total overall deposit of about 0.1 gram of Ag/screen. The screen disc on the feed side of the electrode is left with a projecting tail or lead 52 to allow making electrical connection with power conduit 48. Gas/electrolyte fluid mixture 41 is passed as feed in the direction of the so-identified arrow to emerge, after reaction in the electrode body, as reacted electrolyte 42 and/or withdrawn electrolyte plus unused gas 44 as depicted by the directional arrow so identified. The sort of arrangement described for electrode 17a is well adaptable for either electrolysis or galvanic modes of operation.

Figure 4:
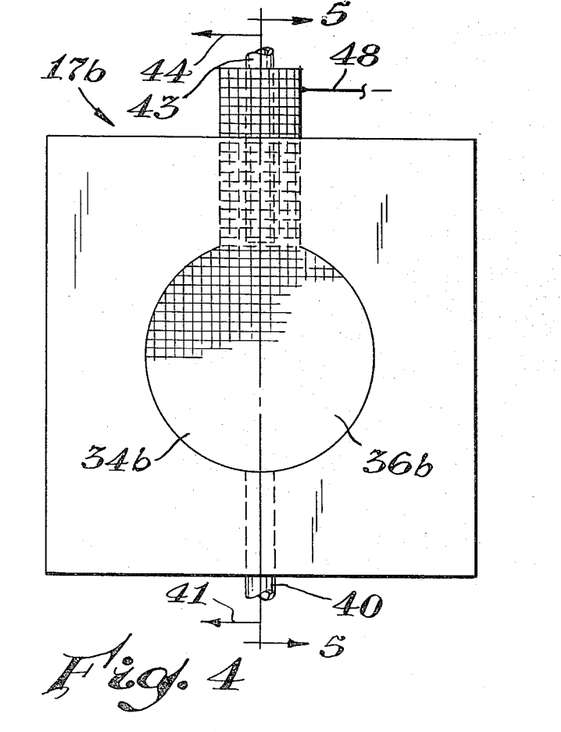
FIGS. 4 and 5, respectively, are views in front elevation and side elevation in cross-section taken for FIG. 5 along the Line 5—5 in FIG. 4 of another embodiment of the present electrode.
Figure 5:
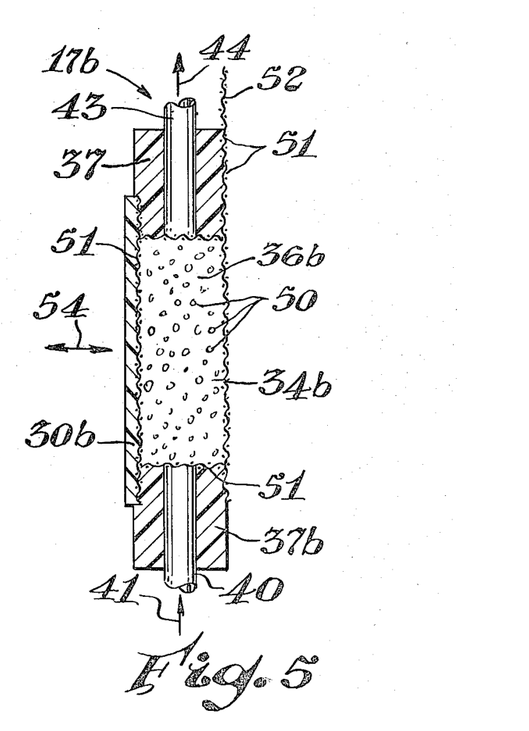

The also relatively small-scale, chip-type electrode depicted in FIGS. 4 and 5 and generally identified by reference numeral 17b is housed in the same type of mounting 37b as used for mounting 37a in the screen-type electrode 17a set forth above in connection with FIGS. 2 and 3. The porous electrode body 34b is made up of a relatively tightly compacted charge of a plurality of silver-plated copper chips 50 each in the form of an approximately 0.25 millimeter thick body in about 1 millimeter square configurations individually coated overall with a roughly 5-6 micron thick silver layer. The collection of chips making up electrode material 36b is kept in place as a constrained mass by an encasing basket fabricated with 200 mesh woven nickel wire screen outer cage or wall sections 51 which completely envelopes the chip mass. While omitted in FIG. 4 but illustrated in FIG. 5, an ion-exchanging membrane separator element 30b is positioned over and against the exposed nickel screen part or packed chip face of electrode body 34b which faces the electrolyte chamber (not shown) in the accompanying cell apparatus (not shown). The screen encasement away from the cell is generally sealed by a closure plate (not shown) and has a lead 52 provided for electrical connection with power conduit 52. Epoxy cement can be satisfactorily employed for securing the element body 34b and separator 30b to mounting 37. In the electrode 17b, gas/electrolyte fluid 41 enters through inlet conduit 40 from the bottom exposed face of the electrode body in a stream as indicated by the directional arrow and is passed upwardly through electrode body 34b to be vented through an upper exposed face of the body into outlet 43 as the reduced electrolyte plus unreacted gas mixture stream 44 flowing out of outlet conduit 43 as is also indicated by a directional arrow. Ion exchange with the electrolyte in the associated cell apparatus (not shown) and the electrolyte in gas/electrolyte feed mixture 41 proceeds, as is denoted by the bidirectional arrow 54, through membrane separator 30b. A chip-style material for the body, as in electrode 17b, usually provides a significantly higher gas/electrode fluid surface area contact per given unit of apparent volume of the electrode body as compared to that usually obtainable with a screen-type apparatus as illustrated in FIGS. 2 and 3. An arrangement patterned after that described for electrode 17b is well suited for (but not limited to) the galvanic mode of function.

Figure 6:
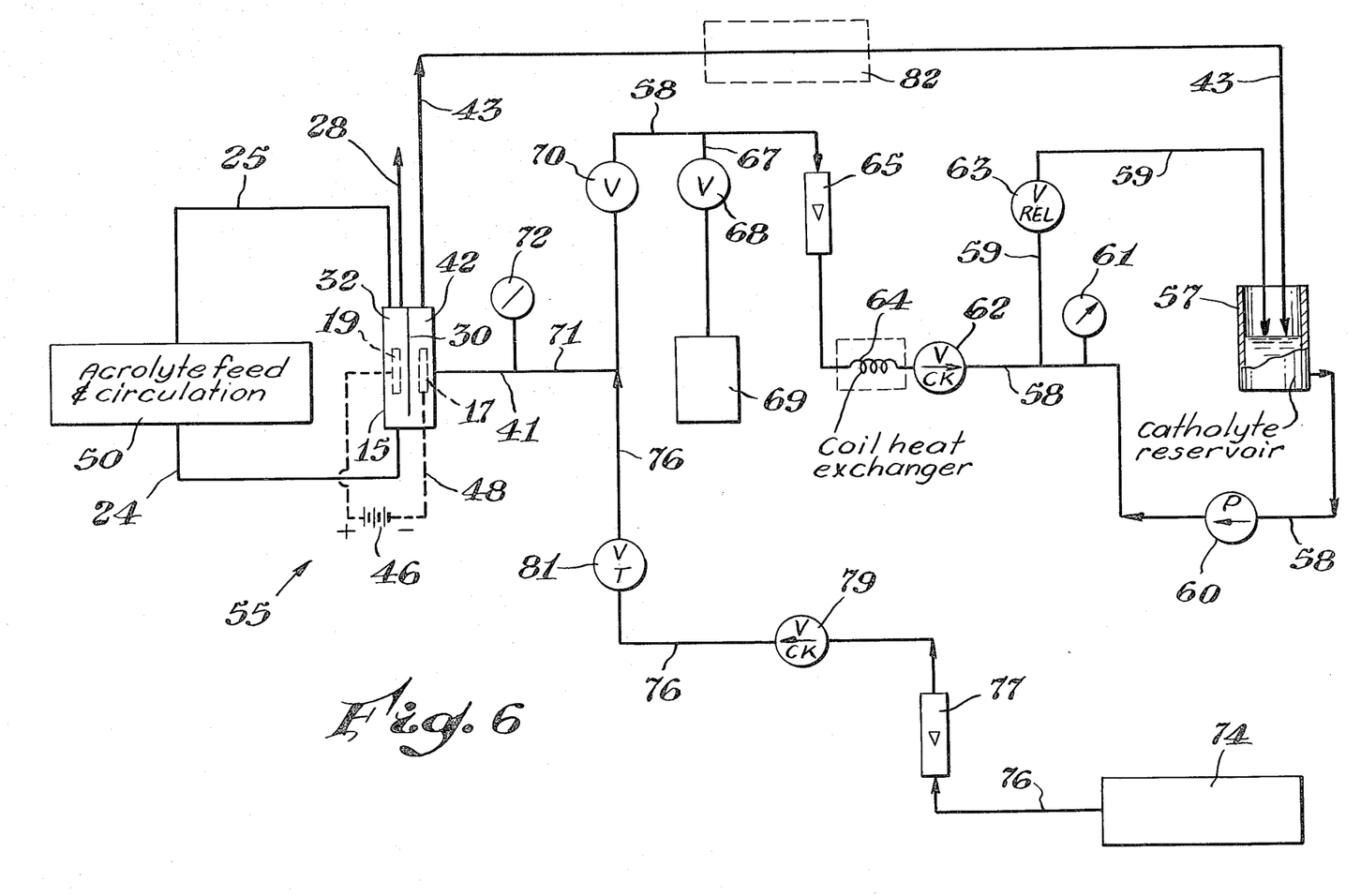
FIG. 6 is a flow sheet diagram view of an electrode pursuant to the invention in an operating cell, as of the variety depicted in FIG. 1, with associated gas/electrolyte supply means for the electrode illustrated.

The flow diagram of FIG. 6 aptly indicates one means of supplying a desired gas/electrolyte fluid mixture to an electrode according to the invention positioned in a cell which, again and for purposes of convenient and more direct explanation (without any limitation thereto), is pictured as operating in the electrolysis mode for the conversion of sodium chloride brine to chlorine and sodium hydroxide.

The cell assembly 15 that is included in the illustrated flow diagram is of the same variety and, although shown in a simplified way so as to denote only most essential parts, identifiable for FIG. 6 by the same reference numerals for parts and elements as those used in FIG. 1 with each member or element functioning as therewith above described. Additionally, a means 56 is also shown associated with the cell to recirculate the spent brine anolyte in line 25 from the anolyte compartment 32 and suitably refortify it for refeed through line 25 to the cell. The fluid interblended homogeneously-phased catholyte feed mixture 41 of desired gas (ordinarily oxygen for a chlor-alkali facility) and aqueous sodium hydroxide solution is admitted to the flooded porous electrode 17 from an efficient mixing apparatus 72 (of a type such as a "Kenics" mixer) for effectively interblending the gas and catholyte supplies fed to it for making the resultant fluid admixture.

The catholyte solution is admitted to the mixer 72 through entry line 71 carrying input of essentially unmixed catholyte and gas from catholyte supply line 58 and gas supply line 76 which are in communication with line 71, as through a "T"-fitting connection. The catholyte emanates from a catholyte reservoir 57 from which it is taken in measured quantities through line 58 by and through a suitable pump means 60. A gauge 61 tells line pressure for feed regulating purposes. A check valve 62 is put in the line 58 after pump 60 to prevent backflow. To control surging and excess liquid supply in line 58 between pump 60 and check valve 62, there is connected a recycle or by-pass line 59 returning to catholyte reservoir 57 through relief or pop valve 63.

A heat exchanger 64, of the coil or other desired type, is placed to bring the catholyte to desired elevated input temperature when this is advantageous, as is frequently the necessary case when cell 15 is run in the electrolysis mode. As indicated by the dashed line enclosure, heat exchanger 64 can be eliminated or by-passed in situations where its function is unnecessary or optional. A rotameter 65 or other flow-measuring means, such as venturi measuring units and so forth, is then placed in the line 58 ahead of the catholyte metering valve 70, which may be a needle valve or any suitable equivalent, to adjust the flow of catholyte into mixer inlet line 71. Make-up water or other reconstituting reagents and/or additaments for desired catholyte formulation is let into line 57 from a suitable source 69 through the inlet line 67 in which is placed metering valve 68.

Caustic rich (or other) catholyte along with any excess gas (the same usually being present) is taken from catholyte chamber 42 for return to the catholyte reservoir 57. If desired, recycled catholyte may also and/or additionally be compositionally readjusted in reservoir 57 where it may be permitted to become degassed or de-bubbled at least substantially if not completely, using purposive positive means (not shown) adapted to achieve that condition in the catholyte if such refining thereof is desired or necessary. In this connection, it is frequently most expedient to remove excess gas from recycled catholyte in order to allow its proper purification and necessary readjustment for re-use in the process. In chlor-alkali operations, excess caustic must be removed from or reduced in concentration in the catholyte (sometimes down to about a 9 weight percent level dissolved in the aqueous solution) before it can be suitably recharged as fresh catholyte feed to the cell. It may oftentimes be advantageous for this purpose to also have a suitable known means in line 43 to take sodium hydroxide out of the recycled catholyte before it goes into reservoir 57. This means, connoted by the box 82 drawn in dashed lines, may be in coordinated supplementation or in replacement of make-up source 69.

The gas for the fluid supply to the porous electrode 17 comes from a suitable source 74. Oxygen-bearing gases are generally employed for practice of the present invention, these most often being oxygen or air in at least stoichiometric quantitative proportions. Nonetheless, any other desired and beneficial gas or gas mixture can be provided and utilized from source 74. The gas, which is suitably pressurized from the source, proceeds in supply line 76 through a suitable flow measuring appliance, such as rotameter 77; thence through a check or other back-feed control valve 79 and metering, flow-adjusting needle or other valve 81 for admission to inlet mixer line 71 along with catholyte feed from line 58. The gas pressure must of course be sufficient to force the gas into the flowing electrolyte stream before entry into the mixture.

Applied Exemplifications Illustrating the Invention

The following Examples illustrate several embodied practices of the invention utilizing apparatus set-ups assembled in the way demonstrated in FIG. 6 of the Drawing and, for the various individual runs made, three different electrode configurations for the purpose. In all cases, silver was used as a catalyst for the involved electrochemical reaction. When the electrodes were operated in the galvanic mode, a zinc sheet was employed for the anode body utilizing an electrolyte solution comprised of a 100 gram/liter aqueous solution of sodium hydroxide. For electrolysis mode operations, the anode was a body of titanium provided with a coating containing oxides of ruthenium and titanium. An aqueous solution of 300 grams of sodium chloride per liter of water was employed as the anolyte and an aqueous solution of 100 grams of sodium hydroxide per liter of water was employed as the catholyte. In all the cells tested, "Nafion" ion exchange membranes (Style 12V6C1) were used for separator elements. A helipot was used as a variable load for galvanic mode testings. A standard power supply was used for the electrolysis. The relative flow rates of gas and electrolyte for mixing prior to passage through the porous cathode electrode was varied as desired for each run.

First Example

A twelve screen electrode to be operated as a cathode was fabricated as described and specified in connection with FIGS. 2 and 3 of the Drawing.

With operation at 40° C. of the electrode in the galvanic mode with oxygen as the gas mixed with the electrolyte, an energy output of 0.25 ampere at a potential of about 0.7 volt was obtained. When the gas utilized was changed to nitrogen, the electrode rapidly polarized with an output of only 0.14 ampere at 0.358 volt. This cell operated using oxygen over 48 hours until the anode failed, at which time there were no signs of cathode deterioration.

Figure 7:
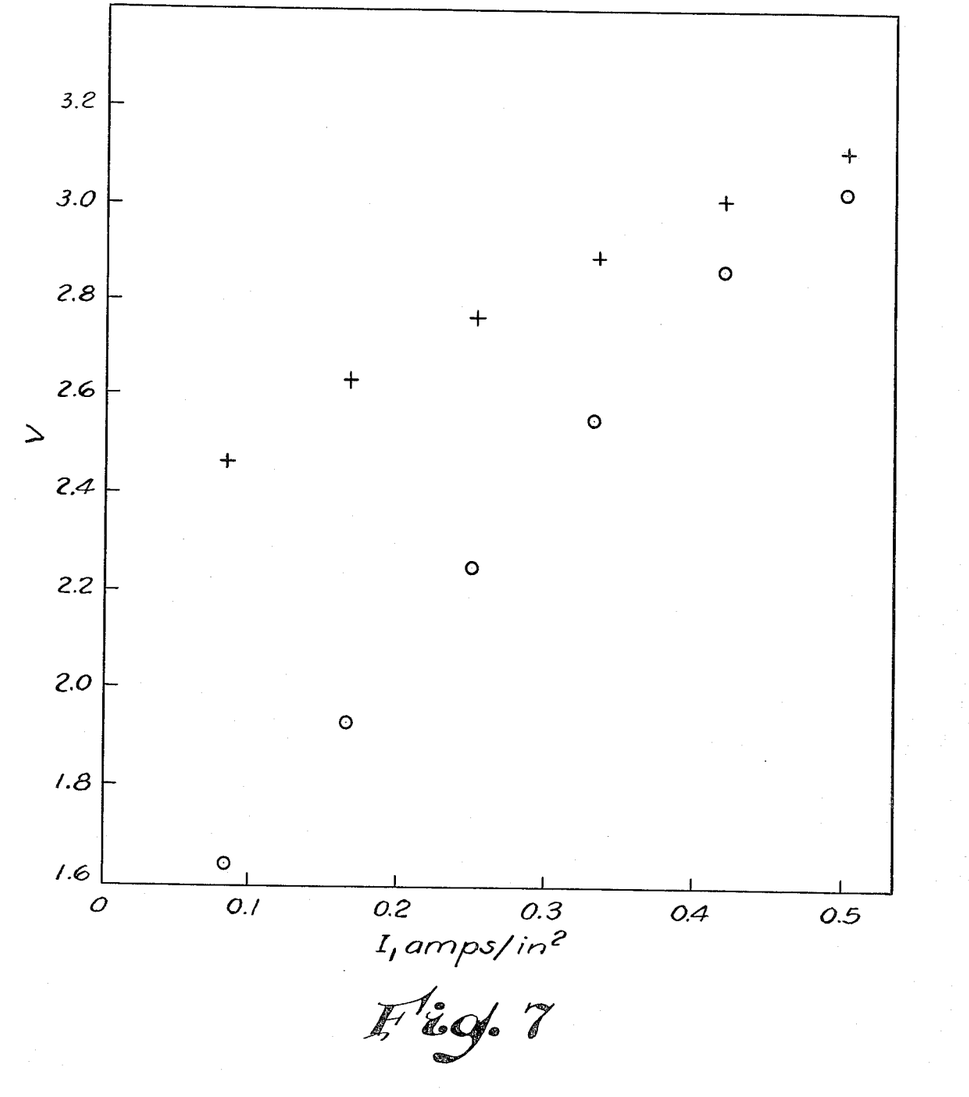
FIGS. 7 through 11, inclusive, are graphs depicting various of the results obtained in the hereinafter set forth illustrative Exemplifications of the invention.

The same embodiment of the cell was operated in the electrolysis mode, passing the gas/catholyte mixture through the stacked nickel screens at a rate of about 1400 ml/min. of the caustic solution and 30 ml/min. of each gas employed. One run was made with oxygen; another with nitrogen; and a third with no gas. The results are set forth in the graph of FIG. 7, with the data points for oxygen plotted with dots; those for nitrogen with crosses; and those for no gas with circles. These results demonstrate that significantly lower voltages can be employed to sustain the same electrolysis curve when oxygen rather than nitrogen or no gas were used.

Second Example

Figure 8:
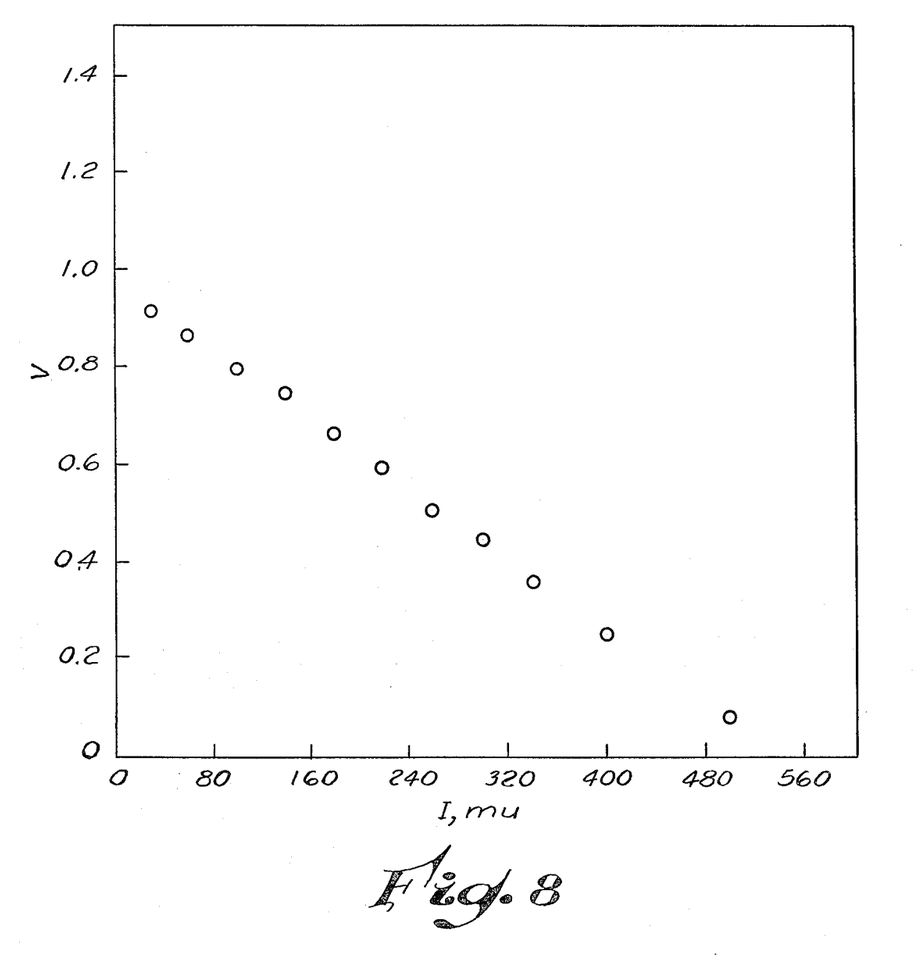
Figure 9:
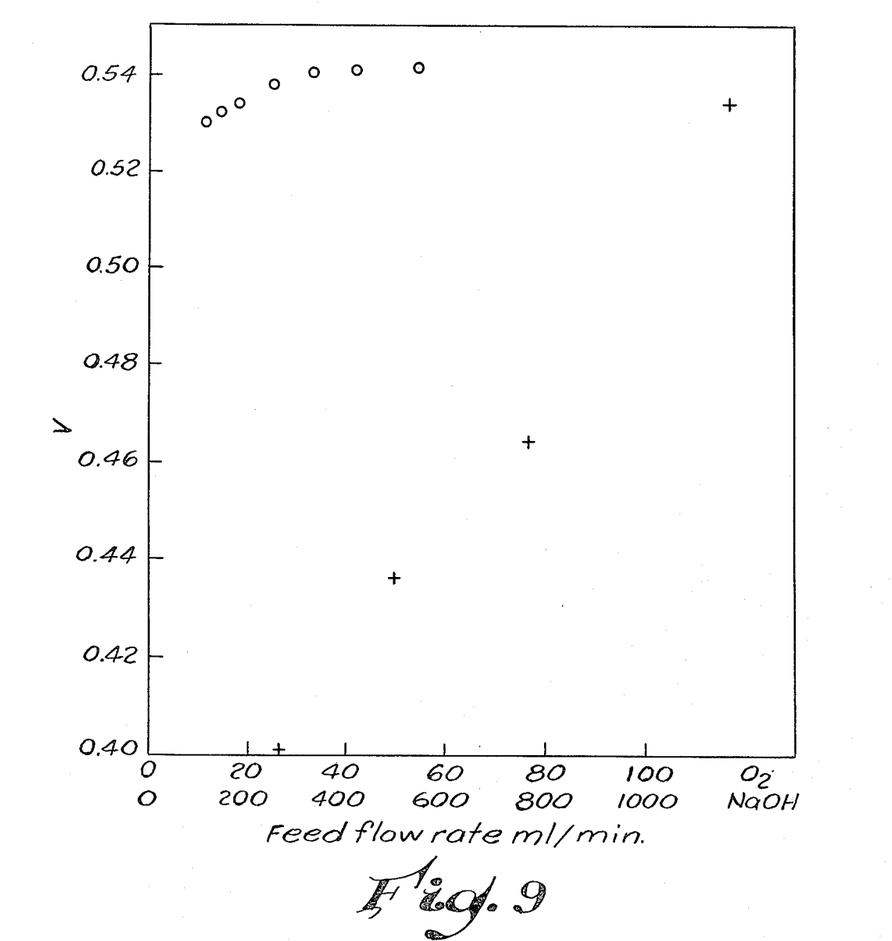

An electrode similar to that employed in Example 1 was used in the galvanic mode at 39° C., excepting that only seven of the nickel screens were in the electrode body. A series of runs were made using an electrolyte mixture of about 11 ml/min. of gas and about 1170 ml/min. of sodium hydroxide solution. Gas pressure was about 10 psi. The advantageous results of this with oxygen employed as the gas are shown in the graph of FIG. 8 with the maximum current obtained being 0.5 ampere at 0.175 volt. In other runs with the same electrode at 39° C., the flow rates of both the oxygen and the caustic solution were varied with constant feed levels of one or the other maintained in the two separate series of the runs performed and an 0.3 ampere current flow regulated out of the cell with the voltage thereof as shown in the graph of accompanying FIG. 9. The varying oxygen and sodium hydroxide flow rates are also plotted in the graph of FIG. 9 by crosses when a constant 18 ml/min. feed of oxygen was made with the caustic feed varied and by crosses when a constant 1170 ml/min. feed of caustic solution was made with the feed of oxygen varied; this further illustrating the beneficial influence of practice of the present invention.

Third Example

Figure 10:
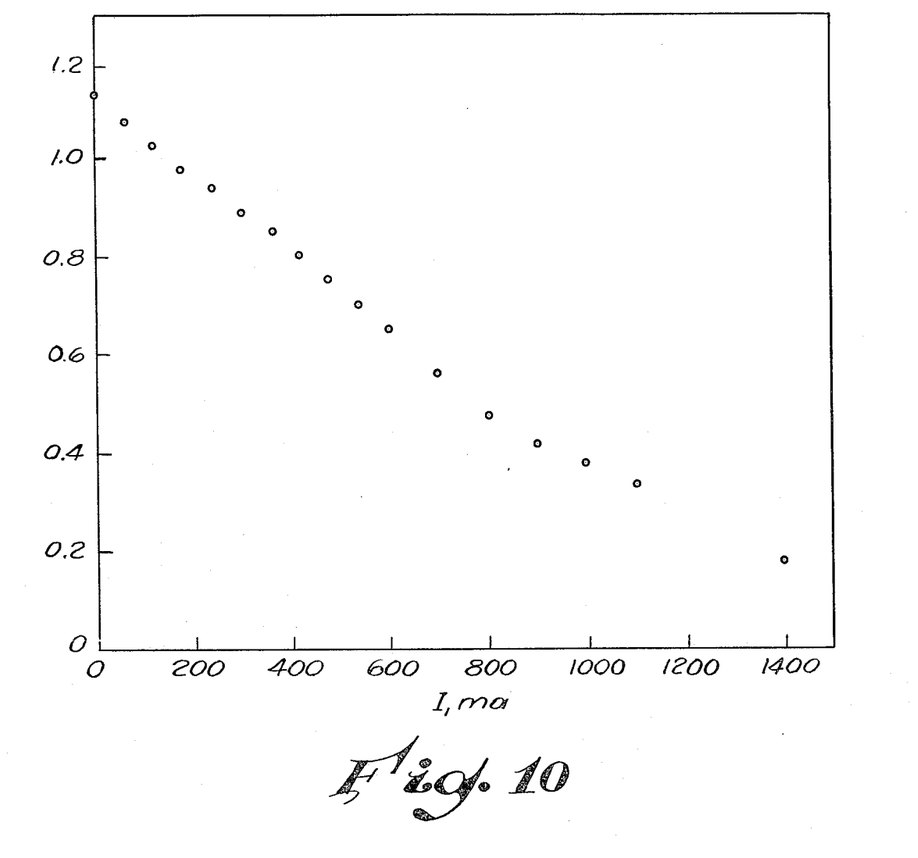
Figure 11:
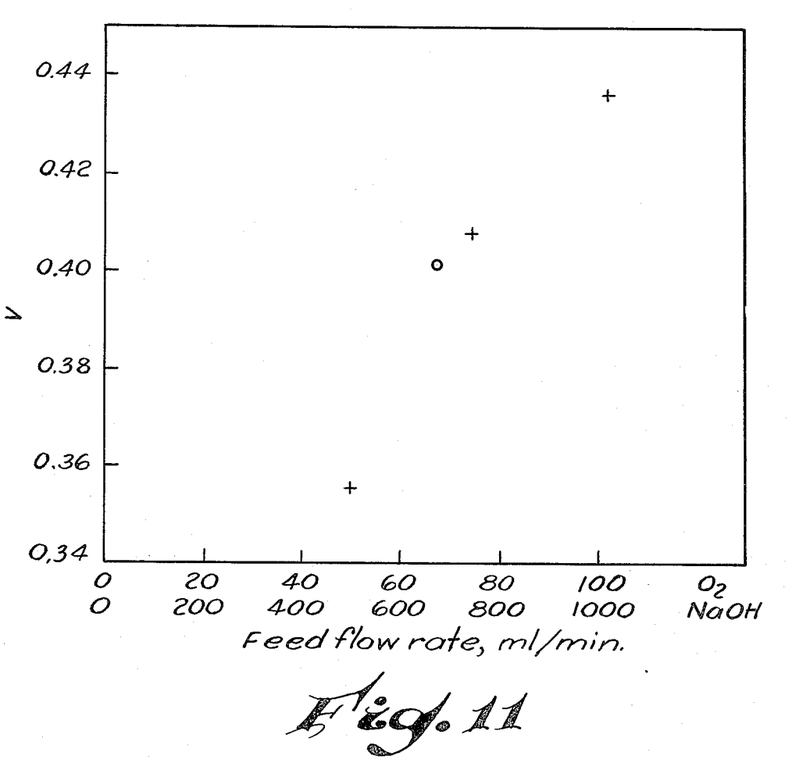

The procedure of Example II was repeated, excepting to employ as the electrode in the system a chip-type embodiment as above described and specified in connection with FIGS. 4 and 5 of the Drawing. The temperature was varied to 40° C. and the gas/electric flow rate proportions fed to the electrode were also varied, with about 14 ml/min. of oxygen and 750 ml/min. of caustic solution used for the runs, the results of which are plotted in FIG. 10 of the accompanying Drawing. For the results plotted in FIG. 11 when testing with 1 ampere cell current conditions (with a current density of about $\frac{1}{3}$ ampere per square inch or ca. 0.0517 ampere per square centimeter) the data points shown by dots were obtained when using a fixed oxygen feed of about 14 ml/min. with varying caustic supply. When using a fixed NaOH catholyte supply of about 750 ml/min. with varying oxygen supply, the data points shown by crosses were determined. The advantage of the greater surface area in the chip-style electrode body is evident from these indicia. A significantly higher current of 1.4 amperes at a current density of about 0.467 amperes per square inch (ca. 0.0723 ampere per square centimeter) at 0.175 volt was realized.

At least equivalent good results were obtained when the procedure was repeated with a similar chip-style unit which utilized silver plated graphite chips to constitute the electrode body.

Fourth Example

The galvanic mode operation of the Third Example was repeated excepting to utilize as the electrode body one that was fabricated of a porous sintered metallic fiber material obtainable as Brunswick Corporation's "Feltmetal 1112". The electrode body was catalyzed by first impregnating it with a solution of silver nitrate in dimethyl formamide to provide about 2 grams of AgNO$_3$ in the electrode body, after which the reagent solution was decomposed for about 90 minutes at about 275° C. Some silver oxide was also formed under these conditions. The cell employing this electrode yielded a current output of about 0.18 ampere at 0.98 volt upon testing.

Equivalent good results are obtainable with other oxygen electrodes deftly made and operated in accordance with the present invention using different specific types and styles thereof (including varying catalyst provisions such as for nonlimiting exemplary purposes, platinum catalyst systems) in and for other particular electrolyzing and galvanic systems.

Many changes and modifications can readily be made and provided in various adaptations and embodiments in accordance with the present invention without substantially departing from the apparent and intended spirit and scope of same relevant to the instantly contemplated oxygen electrode development and provision. Accordingly, the invention and all in pursuance and accordance with same is to be taken and liberally construed as it is set forth and defined in the hereto-appended Claims.

What is claimed is:

1. A method of operating an electrolytic cell comprising:
    forming a gas-liquid mixture of an oxygen-containing gas and a catholyte; and
    flowing the mixture through interconnecting passageways of a porous cathode, while the cathode is maintained at a voltage sufficient to reduce at least a portion of the oxygen as the mixture flows through the cathode, wherein the cathode comprises a plurality of electroconductive screens.

2. A method of operating an electrolytic cell for the electrolysis of a brine solution comprising:
    forming a gas-liquid mixture of an oxygen-containing gas and a catholyte;
    passing the mixture from a first surface portion of a porous cathode to a second surface portion of the cathode through a plurality of interconnecting passageways extending between the first surface portion to the second surface portion; and
    maintaining the cathode at a voltage sufficient to reduce at least a portion of the oxygen.

3. The method of claim 2 wherein at least a portion of the surfaces of the interconnecting passageways are coated with a catalyst active for the reduction of oxygen.

4. The method of claim 2 wherein at least a portion of the surfaces of the interconnecting passageways are wettable by the gas-liquid mixture.

5. The method of claim 2 wherein the average diameter of the interconnecting passageways are from about 0.1 to about 20 microns.

6. The method of claim 2 wherein the cathode comprises a plurality of electroconductive screens stacked in a packed bundle with each one placed against another in the bundle.

7. The process of claim 2 wherein the cathode comprises an assemblage of individually loose electroconductive particles.

8. The process of claim 2 wherein the cathode comprises a sintered metal particle construction.

9. The process of claim 2 wherein the cathode has a thickness of from about 5 to about 500 mils.

10. The process of claim 7 wherein the particles are substantially flat, metallic chips.

11. The process of claim 8 wherein the sintered metal particles contain at least some nickel.

12. The process of claim 2 wherein the catalyst is silver or an alloy thereof.

13. The process of claim 7 wherein the particles are silver plated chips.

14. The process of claim 2 wherein the gas-liquid mixture flows through the cathode in a generally horizontal direction.

15. The process of claim 2 wherein the gas-liquid mixture flows through the cathode in a generally vertical direction.

16. The process of claim 2 wherein the electrolytic cell includes an anode and an ion exchanging membrane, the membrane being placed adjacent to and contacting at least a portion of a wall surface of the cathode and placed so that the membrane is located between the cathode and the anode.

17. The method of claim 2 wherein the gas-liquid mixture is formed outside a cathode compartment.

* * * * *

UNITED STATES PATENT AND TRADEMARK OFFICE
CERTIFICATE OF CORRECTION

PATENT NO. : 4,317,704

DATED : March 2, 1982

INVENTOR(S) : James A. McIntyre, et al.

It is certified that error appears in the above—identified patent and that said Letters Patent is hereby corrected as shown below:

Col. 3, line 31, delete "opening" and insert --openly--.

Col. 3, line 67, delete "of" in front of chlor-alkali and insert --to--.

Col. 5, line 13, delete "anoylte" and insert --anolyte--.

Col. 5, line 39, delete "a" in front of styrene and insert therefor --as--.

Col. 5, line 56, delete "heterogeneously phased" and insert therefor --heterogeneously-phased--.

Signed and Sealed this

Twenty-ninth Day of June 1982

[SEAL]

Attest:

GERALD J. MOSSINGHOFF

Attesting Officer      Commissioner of Patents and Trademarks